United States Patent [19]

Suzuki et al.

[11] Patent Number: 4,904,162
[45] Date of Patent: Feb. 27, 1990

[54] FUEL SUPPLYING PUMP

[75] Inventors: Ryozo Suzuki; Jun Shiraga; Shingo Iwai; Tetsuo Okashiro, all of Fukuyama, Japan

[73] Assignee: Mitsubishi Denki Kabushiki Kaisha, Tokyo, Japan

[21] Appl. No.: 215,208

[22] Filed: Jul. 5, 1988

Related U.S. Application Data

[63] Continuation of Ser. No. 491, Jan. 5, 1987, abandoned.

[30] Foreign Application Priority Data

Jan. 17, 1986 [JP] Japan .............................. 61-5243[U]

[51] Int. Cl.⁴ ............................................. F04D 15/02
[52] U.S. Cl. ..................................... 417/44; 417/410; 417/497
[58] Field of Search .................... 417/13, 44, 497, 410

[56] References Cited

U.S. PATENT DOCUMENTS

| | | | |
|---|---|---|---|
| 2,213,743 | 9/1940 | Miner | 417/44 |
| 2,989,644 | 6/1961 | Schultz | 123/497 |
| 3,617,839 | 11/1971 | Hill | 417/410 |
| 3,631,843 | 1/1972 | Yeiser | 123/497 |
| 3,742,256 | 6/1973 | Frederiksen | 123/497 |
| 4,096,830 | 6/1978 | Long | 123/497 |
| 4,430,980 | 2/1984 | Pidgeon | 123/497 |
| 4,524,312 | 6/1985 | Matsumoto | 417/44 |
| 4,577,604 | 3/1986 | Hara | 123/497 |
| 4,596,514 | 6/1986 | Matsumoto | 417/44 |

FOREIGN PATENT DOCUMENTS

| | | | |
|---|---|---|---|
| 2557608 | 6/1977 | Fed. Rep. of Germany | 417/13 |
| 56-88892 | 7/1981 | Japan | 417/44 |
| 58-155271 | 9/1983 | Japan | 417/44 |

Primary Examiner—Donald E. Stout
Assistant Examiner—D. Scheuermann
Attorney, Agent, or Firm—Robert M. Asher; David G. Conlin; Dike Bronstein

[57] ABSTRACT

A fuel supplying pump having a switching circuit provided in the pump closing. The switching circuit stops the pump when an engine stops rotating due, for instance, to a fuel pipe breakage. The circuit having a transistor with a base connected to an oil pressure responsive switch.

1 Claim, 3 Drawing Sheets

FUEL SUPPLYING PUMP

This is a continuation of co-pending application Ser. No. 000,491 filed on Jan. 5, 1987, now abandoned.

BACKGROUND OF THE INVENTION

The present invention relates to a fuel supplying pump and more particularly to improved control means thereof.

A typical conventional fuel supplying pump has a structure and operation as described hereafter with reference to FIGS. 1 and 2. As shown in FIG. 1, the fuel supplying pump 2 is provided in a fuel tank 4 being supported by a supporting strip 6. The fuel supplying pump 2 sucks fuel in the fuel tank 4 through a suction port 8 and exhausts the sucked fuel through an output port 10.

FIG. 2A shows a cross sectional elevation view of the fuel supplying pump. A rotating shaft 52 is rotatively fixed in a casing 46. The casing 46 comprises a cylindrical body 54, an upper supporting member 20, a pump bracket 42 and a bottom cap 38. The rotating shaft 52 is rotatively supported by metal bearings 24. A detecting magnet 22 and an armature 50 are fixed to the rotating shaft 52. Surrounding the armature 50 with a small gap in between is a yoke 26 having three field windings 28 wound thereon. The yoke 26 is fixed to the inner side of the cylindrical body 54. Electrification of the field windings 28 are controlled by a control circuit 62 so as to generate three phase magnetic field.

At the lower end of the rotating shaft 52, a pump rotor 36 is provided. The pump rotor 36 is rotated in a pump chamber 40 and sucks the fuel through the suction port 8. The sucked fuel is conveyed through a hole 34 and a chamber 30 and is output from the output port 10. A relief valve 44 is provided for limiting a pressure in the chamber 30 within safety range.

On the top surface of the upper supporting member 20, a base plate 58 having a flange 72 is fixed.

The control circuit 62 which detects the rotation of detecting magnet 22 and controls current supplying of the windings 28, is provided on the base plate 58. The control circuit 62 is covered with cover 70. Lead wires 66 are provided passing through the cover 70 and are connected to the control circuit 62 for supplying the power.

FIG. 2B shows a top view of the control circuit 62. On the upper surface of the base plate 58, a board 78 having three Hall elements 76 and IC 68 are fixed. The collectors of power tansistors 60, 60, 60 are connected to corresponding windings 28 by leads 74, respectively.

The operation of the typical conventional fuel supplying pump is described hereafter. The Hall elements 76 generate magnetic field signals corresponding to the rotation of the detecting magnet 22. The magnetic field signals are processed by the IC 68 and control the power transistors 60. The power transistors 60 switch the current of the windings 28, and thus generate a three phase magnetic field. By the three phase magnetic field, the armature 50 and the rotating shaft 52 are rotated. Therefore, the rotor 36 connected to the rotating shaft 52 is rotated, and thus transfers the fuel from the suction port 8 to the output port 10.

A switching circuit 82 receives a signal from an engine (not shown) through a lead wire 200. The switching circuit 82 is covered by a case and is provided in an instrument panel of a car. The switching circuit 82 receives a signal from a conventional switch when that switch detects that the engine has stopped or that the engine speed has decreased a predetermined value. Such a reduction in engine speed may be cuased by a break in the fuel pipe. The switching circuit 82 responds by stopping the fuel supplying pump so as to prevent fuel from further flowing out.

In such a conventional fuel supplying pump, since the switching circuit 82 is provided separate from the fuel supplying pump and provided in the instrument panel, the wire connection work is complex and a particular space therefore is necessary for providing the switching circuit in the instrument panel.

SUMMARY OF THE INVENTION

It is a purpose of the present invention to provide a fuel supplying pump which saves space and is easily wired in an automobile.

A fuel supplying pump in accordance with the present invention comprises, a case, a shaft to which an armature is fixed, a pump mechanism for sucking fuel through a suction port and exhausting the fuel through an output port by rotating a rotary pump provided on the shaft, a detection magnet provided on the shaft, control means for controlling the supply of power to said rotary pump by receiving magnetic field signals from the detection magnet, a first switch responsive to the rotation of an engine for generating a stop signal; and switching means provided in the case, which is turned on by the closing of an ignition switch and which is turned off to stop the pump upon receiving a stop signal from said first switch.

DESCRIPTION OF A PREFERRED EMBODIMENT

Figure 1:
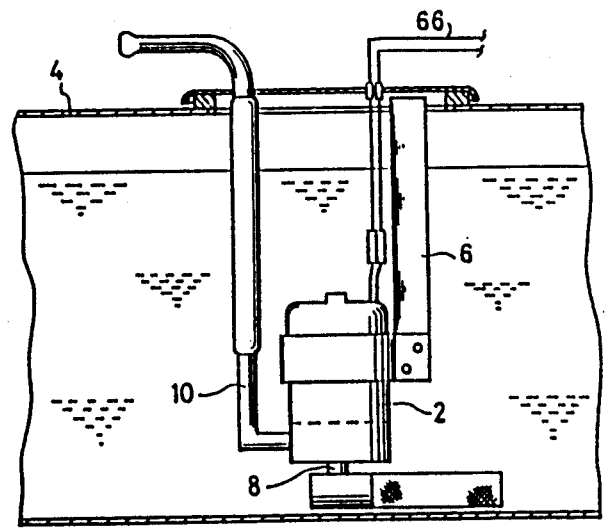
FIG. 1 is the side view of the conventional fuel supplying pump provided in the fuel tank 4.
Figure 3:
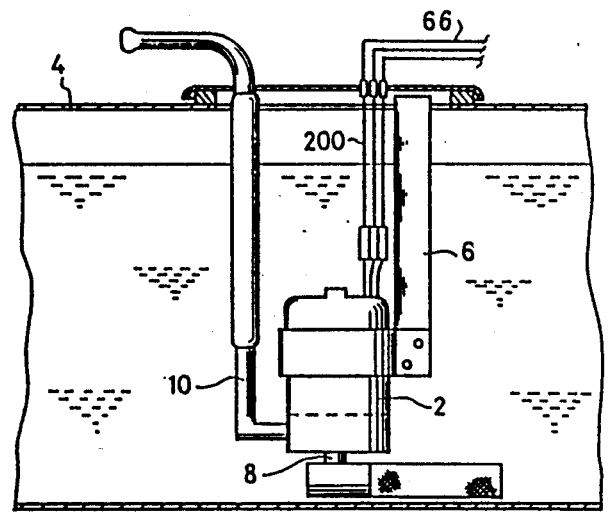
FIG. 3 is a side view of a fuel supplying pump embodying the present invention provided in a fuel tank 4.

A fuel supplying pump in accordance with the present invention has a structure and operation as described hereafter with reference to FIGS. 3, 4A, 4B and 5. As shown in FIG. 3, the fuel supplying pump 2 is provided in a fuel tank 4 being supported by a supporting strip 6. The fuel pump 2 sucks fuel in the fuel tank 4 through a suction port 8 and issues the sucked fuel through an output port 10.

Figure 4A:
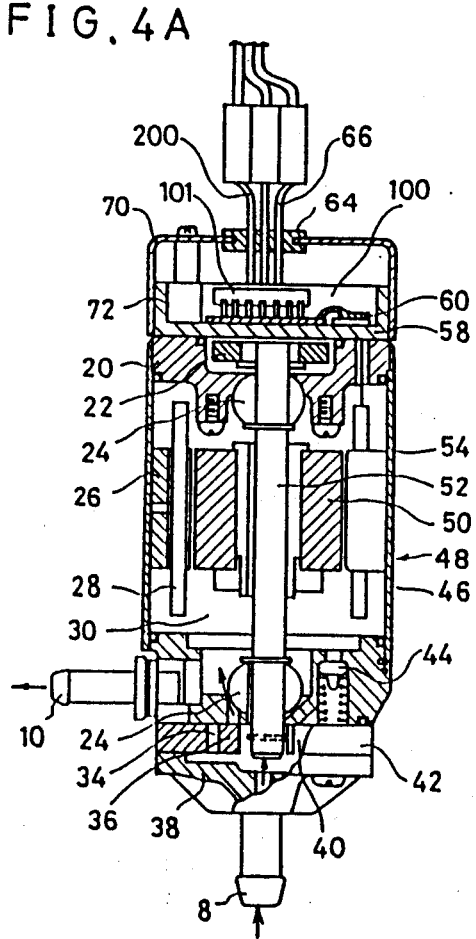
FIG. 4A is a cross-sectional side view of the fuel supplying pump embodying the present invention.

FIG. 4A shows a cross sectional elevation view of the fuel supplying pump. A rotating shaft 52 is rotatively fixed in a casing 46. The casing 46 comprises a cylindrical body 54, an upper supporting member 20, a pump bracket 42 and a bottom cap 38. The rotating shaft 54 is rotatively supported by metal bearings 24. A detecting magnet 22 and an armature 50 are fixed to the rotating shaft 52. Surrounding the armature 50 with a small gap in between, a yoke 26, on which three field windings 28 are wound, is provided by being fixed to the inner side of the cylindrical body 54.

Electrification of the field windings 28 are controlled by a control circuit 100 as so to generate a three phase magnetic field.

At the lower end of the rotating shaft 52, a pump rotor 36 is provided. The pump rotor 36 is rotated in a pump chamber 40 and sucks the fuel through the suction port 8. The sucked fuel is conveyed through a hole 34 and a chamber 30 within safety range.

On the top surface of the upper supporting member 20, a base plate 58 having a flange 72 is fixed.

The control and switching circuit 100 which detects the rotation of detecting magnet 22 and controls current supplying of the windings 28, is provided on the base plate 58. The control and switching circuit 100 is covered with a cover 70. Lead wires 66 are provided passing through the cover 70 and are connected to the control and switching circuit 100 for supplying the power.

Figure 4B:
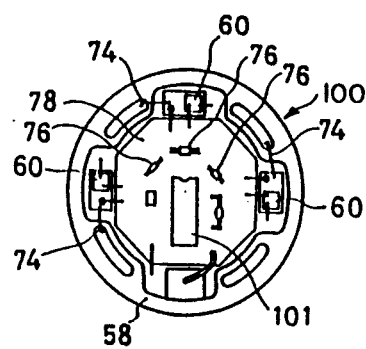
FIG. 4B is a plan view of a control and switching circuit 100 provided in the fuel supplying pump embodying the present invention.

FIG. 4B shows a top view of the control and switching circuit 100. On the upper surface of the base plate 58, a board 78 having three Hall elements 76 and IC 101 are fixed. The collectors of power transistors 60, 60 60 are connected to corresponding windings 28 leads 74, respectively.

The operation of the fuel supplying pump in accordance with the present invention is described hereinafter. The Hall elements 76 generate magnetic field signals corresponding to the rotation of the detecting magnet 22. The magnetic field signals are processed by the IC 101 and control the power transistors 60. The power transistors 60 switch the current of windings 28, and thus generate a three phase magnetic field. By the three phase magnetic field, the armature 50 and the rotating shaft 52 are rotated. Therefore, the rotor 36 connected to the rotating shaft 52 is rotated, and thus transferred the fuel from the suction port 8 to the output port 10.

Figure 5:
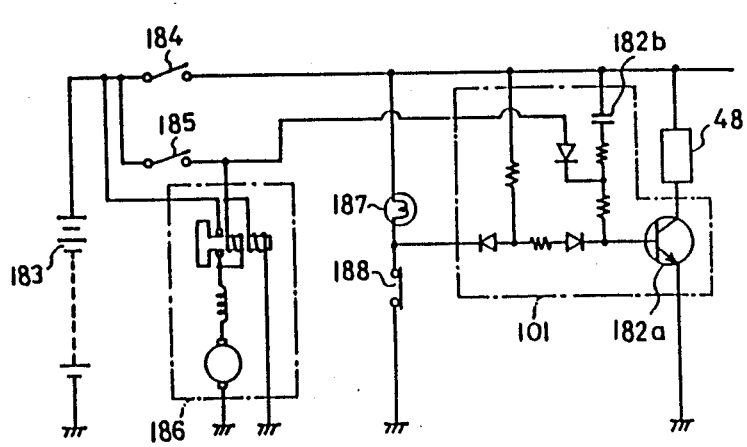
FIG. 5 is a circuit diagram of fuel control system embodying the present invention.
Figure 2A:
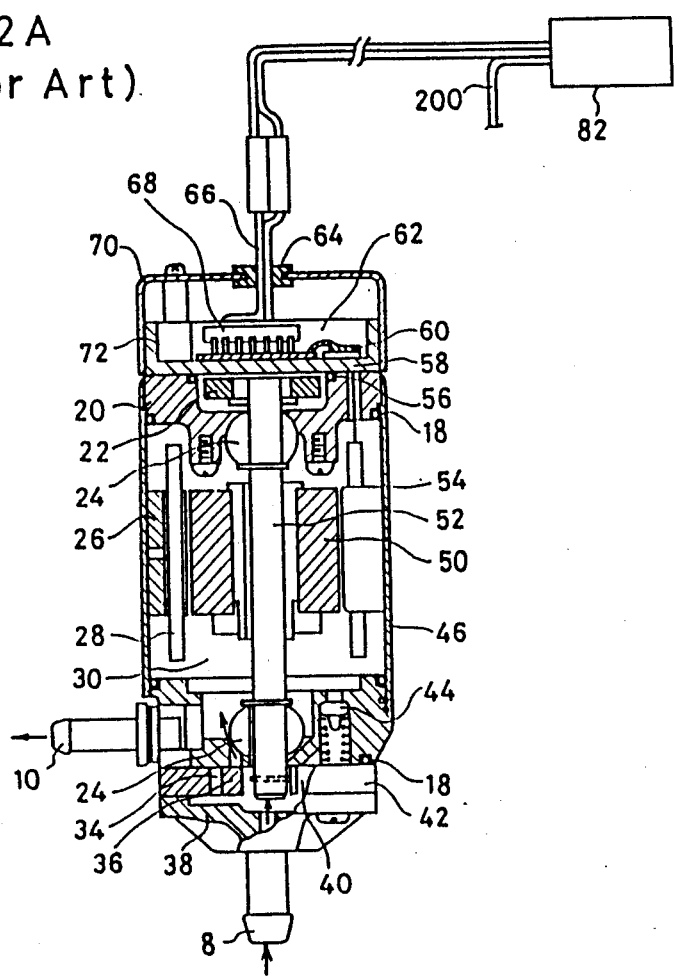
FIG. 2A is the cross-sectional side view of the conventional fuel supplying pump.
Figure 2B:
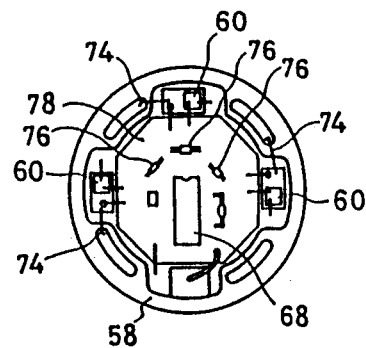
FIG. 2B to the plan view of the control circuit 62 provided on the conventional fuel supplying pump.

FIG. 5 shows a fuel control system of an engine. In FIG. 5, a relay circuit is shown which is disposed in and forms a part of the IC 101. A warning lamp 187 is generally provided on the instrument panel of the car. A switch 188 is the conventional switch disposed on the engine for generating a stop signal in response to a stopping of engine rotation or a predetermined decrease in engine rotation. The switch 188 is responsive to oil pressure which in turn is proportional to the rotation speed of the engine. Closing of a car ignition switch 184 starts charging of a capacitor 182b. During the charging operation, a transistor 182a is in ON state. Therefore, the pump mechanism 48 is operated and supplies the fuel to the engine. Then, the transistor 182a turns off at ending of the charging operation of the capacitor 182b.

At closing of a starting switch 185, the transistor 182a again turns on because a battery 183 supplies voltage to a base of the transistor 182a through the switch 185.

Therefore, the engine is supplied with fuel. At the same time, a starting device 186 starts the engine. Increase in the engine rotations opens the switch 188. Therefore, the transistor 182a holds the ON state and the pump mechanism 48 supplied the fuel to the engine during the engine rotation.

When the engine stops by a trouble such as a break in the fuel pipe, the switch 188 is closed to cut off the power to the base of transistor 182a. Therefore the transistor 182a becomes OFF state and the pump 48 stops. Thus, by operation of the relay circuit 182, the flow of fuel is stopped in a short time in response to fuel pipe breakage.

As has been described in detail for various embodiments, the fuel supplying pump can save the space on the instrument panel, as a result of providing the switching circuit in the casing of the fuel supplying pump.

Although the invention has been described in its preferred form with a certain degree of particularly, it is understood that the present disclosure of the preferred form can be changed in the details of contruction and in the combination and arrangement of parts without departing from the spirit and the scope of the invention as hereinafter claimed.

We claim:

1. A fuel supplying pump control system for a motor vehicle comprising:
   (a) a pump mechanism having,
      a suction port from which fuel in a fuel tank is sucked;
      a rotor rotating in a pump chamber for sucking said fuel;
      an electric motoro for rotating said rotor; and
      an output port from which said sucked fuel is exhausted;
   (b) a control circuit disposed in said pump mechanism having,
      a transistor having an emitter which is grounded, a collector which is connected to said pump mechanism, and a base; and
      a capacitor connected to the base of said transistor;
   (c) a warning lamp disposed on an instrument panel of a car;
   (d) a first switch disposed on an engine of said motor vehicle, responsive to oil pressure, said oil pressure being proportional to rotation speed of said engine, said first switch closing when said engine stops, said first switch having a terminal coupled to said base of said transistor and to said warning lamp;
   (e) an ignition switch, having one terminal connected to said electric power source and an other terminal connected to said pump mechanism and said capacitor; and
   (f) a starting switch, having one terminal connected to said power source and an other terminal connected to a starting means for starting said engine and said base of said transistor.

* * * * *